(12) United States Patent
Cohen et al.

(10) Patent No.: US 11,720,643 B2
(45) Date of Patent: Aug. 8, 2023

(54) METHODS OF WEBSITE GENERATION

(71) Applicant: BublUp, Inc., Arlington, VA (US)

(72) Inventors: Alain J Cohen, McLean, VA (US);
Marc A Cohen, McLean, VA (US);
Alberto Morales, Charlotte, NC (US);
Carolyne LaSala, Isle of Palms, SC (US); Yevgeny Gurevich, Bethesda, MD (US)

(73) Assignee: Bublup, Inc., Arlington, VA (US)

( * ) Notice: Subject to any disclaimer, the term of this patent is extended or adjusted under 35 U.S.C. 154(b) by 445 days.

(21) Appl. No.: 16/118,289

(22) Filed: Aug. 30, 2018

(65) Prior Publication Data
US 2020/0074010 A1    Mar. 5, 2020

(51) Int. Cl.
| | |
|---|---|
| *G06F 15/16* | (2006.01) |
| *G06F 16/958* | (2019.01) |
| *H04L 67/02* | (2022.01) |
| *G06F 16/16* | (2019.01) |
| *G06F 16/182* | (2019.01) |
| *G06F 40/166* | (2020.01) |
| *G06F 40/106* | (2020.01) |
| *G06F 40/14* | (2020.01) |
| *G06F 3/0482* | (2013.01) |
| *H04L 67/01* | (2022.01) |

(52) U.S. Cl.
CPC .......... *G06F 16/986* (2019.01); *G06F 3/0482* (2013.01); *G06F 16/164* (2019.01); *G06F 16/183* (2019.01); *G06F 40/106* (2020.01); *G06F 40/14* (2020.01); *G06F 40/166* (2020.01); *H04L 67/01* (2022.05); *H04L 67/02* (2013.01)

(58) Field of Classification Search
CPC .... G06F 16/986; G06F 16/164; G06F 40/166; G06F 40/106; G06F 40/14; G06F 3/0482; H04L 67/02; H04L 67/01
USPC ........................................................ 709/219
See application file for complete search history.

(56) References Cited

U.S. PATENT DOCUMENTS

| | | | |
|---|---|---|---|
| 2005/0149549 A1 | 7/2005 | Jaspers | |
| 2005/0262439 A1* | 11/2005 | Cameron | G06F 16/116 715/239 |
| 2006/0184540 A1* | 8/2006 | Kung | G06F 16/188 |
| 2012/0030562 A1 | 2/2012 | Tsai et al. | |
| 2013/0226649 A1 | 8/2013 | Grissom | |
| 2013/0239049 A1 | 9/2013 | Perrodin et al. | |
| 2013/0246901 A1 | 9/2013 | Massand | |

(Continued)

OTHER PUBLICATIONS

Office Action for U.S. Appl. No. 16/371,575, dated Jun. 23, 2020, 18 pages.

(Continued)

*Primary Examiner* — Suraj M Joshi
*Assistant Examiner* — Joel Mesa
(74) *Attorney, Agent, or Firm* — Danielson Legal LLC

(57) ABSTRACT

Methods of generating websites using any combination of remotely and locally stored content are contemplated. Content is procured by a user on a client computer, and a request to add that content to a source folder is sent to a server. The server adds the content to the source folder, where it is made available for website creation. When a client requests creation of a website using the contents of a source folder, the server then generates that website. In some embodiments, the website can be generated according to a user-selected theme or a default theme.

9 Claims, 3 Drawing Sheets

(56) References Cited

U.S. PATENT DOCUMENTS

| | | | |
|---|---|---|---|
| 2014/0149794 A1* | 5/2014 | Shetty | G06F 16/951 709/213 |
| 2014/0198127 A1 | 7/2014 | Ying | |
| 2018/0032479 A1* | 2/2018 | Ding | G06F 40/186 |
| 2018/0321738 A1* | 11/2018 | Jassal | G06Q 30/0261 |
| 2019/0114308 A1 | 4/2019 | Hancock | |

OTHER PUBLICATIONS

Office Action for U.S. Appl. No. 16/371,575, dated Jul. 16, 2021, 25 pages.

* cited by examiner

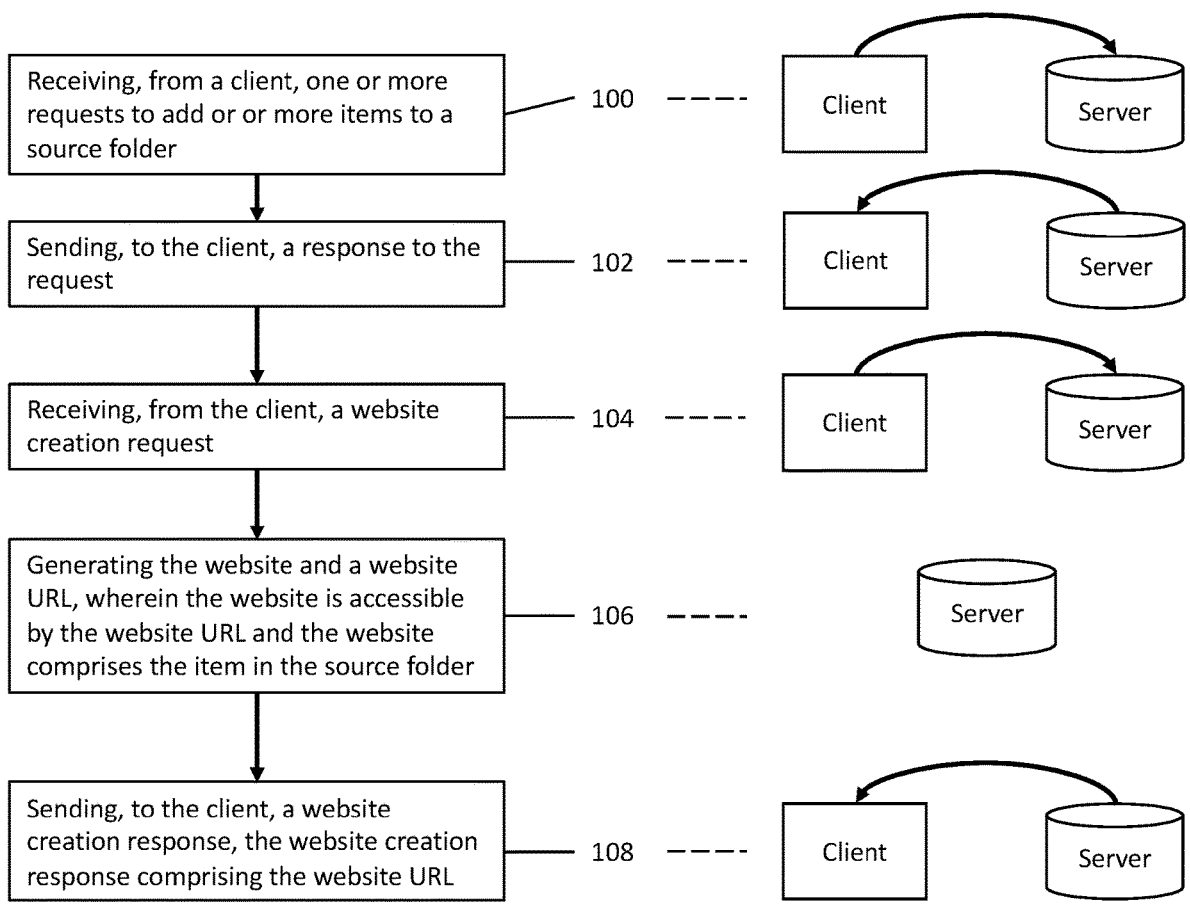
Figure 1A                                    Figure 1B

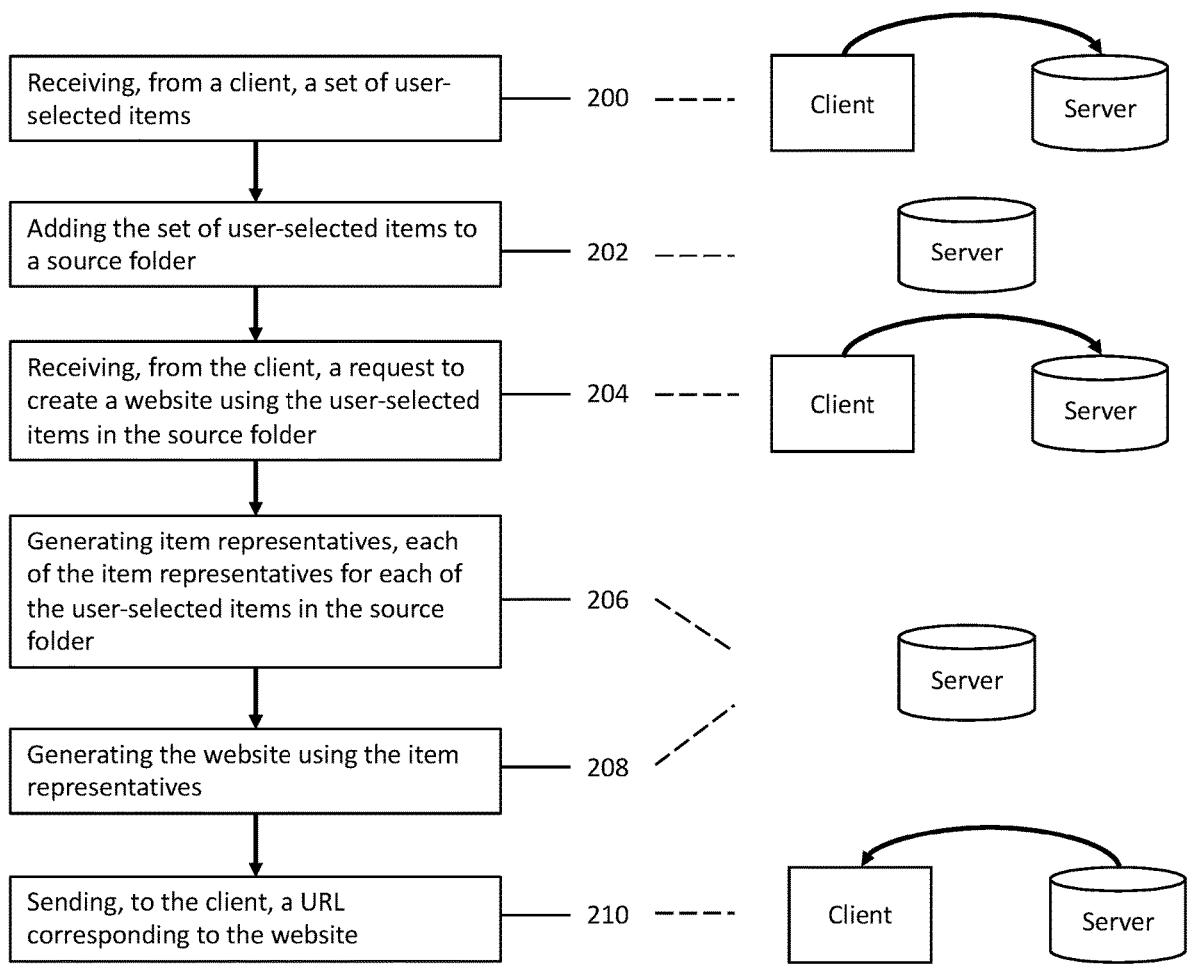

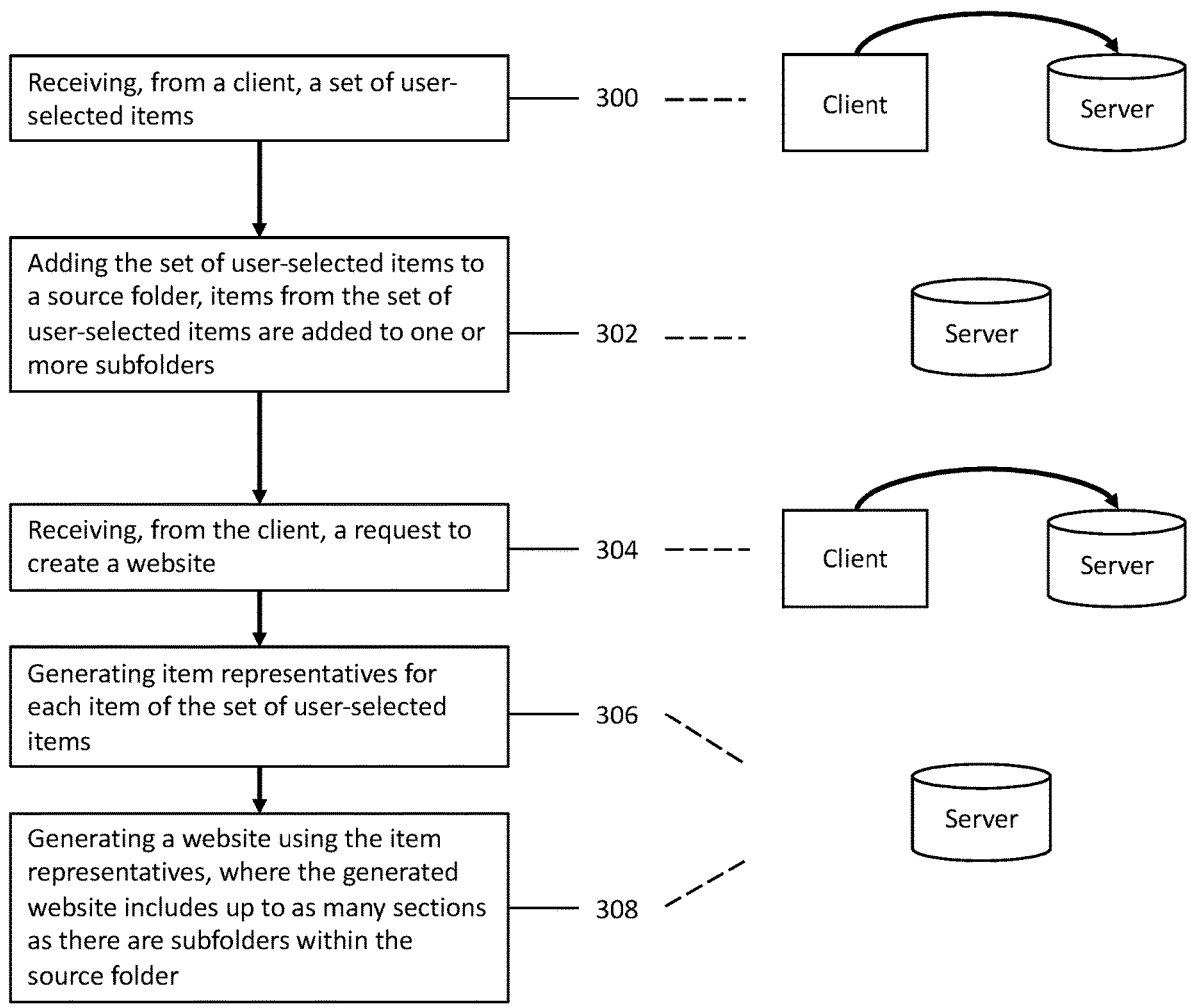
Figure 3A                                    Figure 3B

METHODS OF WEBSITE GENERATION

FIELD OF THE INVENTION

The field of the invention is website generation technologies.

BACKGROUND

The background description includes information that may be useful in understanding the present invention. It is not an admission that any of the information provided in this application is prior art or relevant to the presently claimed invention, or that any publication specifically or implicitly referenced is prior art.

Sharing content is an integral part of using the Internet, and the way in which Internet users share content is constantly evolving. Oftentimes, people share single items of content directly with one another, and that is fine for things like news articles, pictures, podcasts, etc. But in many instances, people want to be able to share more than one item of content with many people at once. One of the best ways to do that is to make that content publicly available all in one place by building a website.

But building a website is not a trivial endeavor. Even when using a service designed to make building a website simple, users are required to do the labor of building each page on a site according to a theme. The content that goes onto a website must be manually entered onto the site according to the restrictions of that theme, which requires a user to do quite a lot more work than is warranted for the simple desire of sharing content.

Thus, developments in content sharing have failed to appreciate advancements in website building technology that facilitate simple and quick creation of websites for sharing all kinds of content.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

Thus, there is still a need in the art for improved website generating technologies.

SUMMARY OF THE INVENTION

The present invention provides systems and methods of website generation using locally and remotely stored content. One aspect of the inventive subject matter contemplates a method of generating a website, where the method includes the steps of: receiving, from a client, a request to add an item to a source folder, the request including an upload file attribute having a filename and a content type where the upload file attribute is associated with the item, and a save-to-folder identifier associated with the source folder; sending, to the client, a response to the request, the response including a source folder identifier and item attributes that include an item type and a URL; receiving, from the client, a website creation request, the website creation request including the source folder identifier; generating the website and a website URL, wherein the website is accessible by the website URL and the website comprises the item in the source folder; and sending, to the client, a website creation response, the website creation response comprising the website URL. In some embodiments, the item attributes can include a MIME type.

In some embodiments, the request to add an item to a source folder also includes one, or any combination of: an annotation attribute associated with the item; a title attribute comprising a title of the item; a title assignment attribute; an annotation assignment attribute; an image assignment attribute; an add-to-folder type; a URL associated with the item; and a save method attribute.

In some embodiments, the save-to-folder identifier can include a token that is associated with the source folder. In the same or other embodiments, the save-to-folder identifier is the same as the source folder identifier.

It is contemplated that the response to the request to add an item to a source folder can additionally include one, or any combination of: a completion status indicator; a created-at indicator; a data-storage-usage indicator; a description; image attributes; a title; and a name.

In some embodiments, the website creation request further comprises one, or any combination of: a name; a subtitle; a description; an image URL; and a theme. The response to the website creation request can additionally include one, or any combination of: author attributes comprising an author name and an author avatar; an author identifier; an analytics ID; a created-at attribute; a data storage usage attribute; a description; a website image; a website name; the source folder identifier; and a visual completion status.

Another aspect of the inventive subject matter contemplates a method of generating a website that includes the steps of: receiving, from a client, a set of user-selected items, the set of user-selected items including at least a first website address and a second website address; adding the set of user-selected items to a source folder having an associated source folder identifier; receiving, from the client, a request to create a website, the request comprising the source folder identifier; generating item representatives, each of the item representatives comprising at least one of a text block and an image corresponding to one of the set of user-selected items; generating the website using the item representatives; and sending, to the client, a URL corresponding to the website.

In some embodiments, the request to create a website can also include a user-selected theme, where the website is generated at least in part according to the user-selected theme. In the same or other embodiments, the source folder identifier comprises a source folder token, and the source folder token can be, or include, a UUID.

Another aspect of the inventive subject matter contemplates a method of generating a website that includes the steps of: receiving, from a client, a set of user-selected items, the set of user-selected items comprising at least a first website address and a second website address; adding the set of user-selected items to a source folder having an associated source folder identifier, wherein the first website address is assigned to a first subfolder within the source folder, and wherein the second website address is assigned to a second subfolder within the source folder; receiving, from the client, a request to create a website, the request comprising the source folder identifier; generating item representatives for each item of the set of user-selected items, each of the item representatives comprising at least one of a description and an image; and generating a website using the item representatives, where the generated website includes a first section based on the first subfolder and a second section based on the second subfolder.

In some embodiments, the request to create a website further comprises a user selected theme, and the website can then be generated according to the user-selected theme. The source folder identifier can include a source folder token, and the source folder token can be, or include, a UUID.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1A is a flow chart of an embodiment of the inventive subject matter.

FIG. 1B shows request and response flow between a client and a server for the flow chart of FIG. 1A.

FIG. 2A is a flow chart of another embodiment of the inventive subject matter.

FIG. 2B shows request and response flow between a client and a server for the flow chart of FIG. 2A.

FIG. 3A is a flow chart of another embodiment of the inventive subject matter.

FIG. 3B shows request and response flow between a client and a server for the flow chart of FIG. 3A.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Methods of the inventive subject matter are directed to on-demand creation of websites using user-selected content. Users frequently need to quickly put together easy-to-access websites using a variety of content that is either remotely stored (e.g., content stored somewhere on the Internet, such as a website, web server, or cloud server(s)) or locally stored (e.g., content that is stored on a user's computer, such as a photograph or PDF document). Methods of the inventive subject matter facilitate creation of websites using any combination of locally and remotely stored content.

Each attribute described in this application can include an array of attributes of that kind. "Array" should be interpreted to mean any data structure—either known or discovered in the future—that is capable of storing the data or information that an array is described as being able to store. A linked list, for example, is included in this definition of "array." All attributes in this application, unless otherwise stated, should be interpreted as comprising either a single attribute or an array of attributes.

Many of the features and attributes discussed in this application can be applied to or used in all embodiments of the inventive subject matter described in this application, regardless of the embodiment where that attribute is discussed. The same is true for all of the subject matter described in this application unless explicitly stated otherwise.

Further, the steps of methods described in this application can be completed in an order other than that in which they are described, unless specifically described as being executed in a particular order or unless a particular order of execution is necessary to properly carry out the method.

FIGS. 1A and 1B show an embodiment of the inventive subject matter. In the method shown in these figures, the execution of various steps results in a newly generated website that incorporates user-selected content (e.g., remotely stored content, locally stored content, or some combination thereof). Interactions in the method involve a client and a server, where "client" refers to, for example, a computing device (e.g., a computer, a laptop, a mobile device, or the like) that is controlled by a user, and "server" refers to a computing device intended to host, for example, a website or web service (e.g., a server, cloud server, or other networked computer configured as a host).

For a server to generate a website using user-selected content, first the user must select and store that content in a way that makes it locally accessible to the server. In step 100, a server receives, from a client, a request to add an item to a source folder. A source folder is managed by the server and can be hosted on the server as well. The source folder is an organizational tool used to group items together, where an "item" is either locally or remotely stored content. An item can be, for example, a photograph, a document (e.g., *.pdf, *.docx, or any other filetype), a website, an audio recording, or any other type of content that can be remotely or locally stored. A user uses their computing device (e.g., where the user's computing device is the "client") to create the source folder (and optionally, one or more subfolders within the source folder), and also to select an item to add to the source folder. With the item identified, the client sends a request to the server, where the request includes information sufficient to identify the item and it requests that the item be added to the source folder.

Information sufficient to identify the item can include one, or any combination of, the following attributes: an annotation attribute associated with the item; a title attribute comprising a title of the item; an add-to-folder type; an upload file attribute; a URL; a title assignment attribute; an annotation assignment attribute; an image assignment attribute; a save method attribute; a save-to-folder identifier; and a browser attribute.

The add-to-folder type attribute indicates how the item is to be added to the folder. For example, if locally stored content is to be added (e.g., saved) to the folder, then the add-to-folder type attribute could be set to "upload" (e.g., a descriptor stored as a string), indicating that the item will be added to the folder via upload (e.g., from the client). In another example, if remotely stored content such as a website is to be added to the folder, the, the add-to-folder type attribute could be set to "link," since a website link would be sufficient to identify the website to be added to the source folder. In such a case, the server may then request the relevant item for local storage using the link.

The upload file attribute includes one or both of a filename and a content type. For example, if the item to be added to the source folder is a PDF, then the content type could be "PDF" and the filename can be the name of the PDF file.

In an embodiment where the item to be added to the folder is a website or other remotely stored content that can be accessed using a web address, a URL is included as an attribute. The URL attribute indicates a location where the remotely stored item can be located. In some embodiments, the URL can comprise an IP address, a web address, or other type of resource locator.

A title assignment attribute can also be associated with the item. The title assignment attribute can be a TRUE/FALSE indicator to indicate whether the server or the user will determine the title attribute for the item. For example, if the title assignment attribute is set to TRUE (or 1 or "Yes" or another binary indicator), then the server can automatically extract a title from the corresponding item (e.g., the title of a website, PDF document, etc.) and set that title as the title attribute for the item. If the title assignment attribute is set to FALSE (or 0 or "No" or another binary indicator), then a title provided by the user will be set as the title attribute for the corresponding item. In embodiments, a user can input a title for an item at the time the item is saved to a source folder, or at some later point in time.

An annotation assignment attribute operates similarly to the title assignment attribute. If the annotation assignment attribute is set to TRUE, then the server can automatically extract an annotation (e.g., snippet, summary, or metadata associated with the item) and set that annotation as the annotation attribute for the item. Otherwise, if the annotation assignment attribute it is set to FALSE, then an annotation provided by the user will be set as the annotation attribute for the corresponding item. In embodiments, a user can input an annotation for an item at the time the item is saved to a source folder, or at some later point in time.

An image assignment attribute is another indicator attribute. If the image assignment attribute is set to TRUE, then the server can automatically extract a representative image (e.g., an image contained within the item) and set that image as the image attribute for the item. Otherwise, if the image assignment attribute is set to FALSE, then a representative image selected by the user will be set as the image attribute for the corresponding item. For example, if the item to be added to the source folder is a website having an image associated with it (e.g., a Wikipedia entry having a featured image), then the server can automatically extract that image and set it as the image attribute. Alternatively, the user can select some other representative image to be set as the image attribute. In embodiments, a user can select an image for an item at the time the item is saved to a source folder, or at some later point in time.

A save method attribute indicates how an item is to be saved to the source folder. For example, if an item is locally stored, then the save method attribute can indicate that the save method is "upload." In embodiments where, for example, the item to be saved to the source folder is remotely stored and can be accessed via URL, then the save method attribute can indicate that the save method is "url_only."

A save-to-folder identifier can identify, for example, the source folder or a non-permanent folder in which an item (or items, if there are more than one) is temporarily stored before adding it to the source folder. In some embodiments, the save-to-folder identifier is associated with a request to add an item to a source folder such that, for example, a server can distinguish between multiple requests from different clients. In some embodiments, the save-to-folder identifier is a Universally Unique Identifier (UUID), and in other embodiments, the save-to-folder identifier is unique within the server, but not universally unique. In some embodiments, the save-to-folder identifier can be used by the server in the process of generating a source folder (e.g., the source folder does not exist until the request is received and processed by the server), and once the source folder is generated, the save-to-folder identifier can become the source folder identifier, or, in some embodiments, the source folder can be given a new source folder identifier.

Finally, a browser attribute can be included to identify the web browser with which the client sent the request to the server (e.g., Firefox, Chrome, Safari, etc.).

The server, after receiving the request to add an item to the source folder, then saves the item to the source folder, and responds to the request as shown in step 102. Saving an item to a source folder can include, for example, storing an item to a server in such a way that the item can be accessed via the source folder. This can be accomplished in a variety of ways depending on how the server (or other computing device) is configured (e.g., it can depend on the file structure). The response includes one, or any combination of, the following: a completion status indicator; a created-at indicator; a data-storage-usage indicator; a description; image attributes; a name; a title; a source folder identifier; and item attributes corresponding to the item.

A completion status indicator informs the client as to whether activities related to the client's request are completed. In some embodiments, the server's response to the client's request to add an item to the source folder can be sent to the client before all of the server's activities related to saving the item are completed.

A created-at indicator includes information about when the item was created on the server (e.g., when the item was saved to the source folder and recorded in the server as being present in the source folder). In some embodiments, the created-at indicator includes a time and date.

A data-storage-usage indicator can indicate, for example, the amount of memory or storage being used by the item on the server when it is stored in the source folder. This value can be useful to facilitate optimization during website generation. For example, if the data-storage-usage indicator indicates that the item is relatively large (e.g., the item, when included in a generated website, would consume more data than necessary to send to clients on mobile plans with limited data plans), then the item can be optimized during (or before) the website generation step. In some embodiments, optimization can include compressing images into different formats, optimizing documents (e.g., PDFs) to occupy less space, and the like.

A description can include a brief description of the item. The description can be pulled from the content of the item itself (e.g., from the contents of a document or website), or it can be pulled from the item's metadata (e.g., a description that exists in a PDF's metadata).

Image attributes can include information sufficient to describe several aspects of an image associated with an item. For example, the image attributes can include an array of information about an image including a full URL pointing to the original image or to an optimized version of the image, dimensions of the image, a tint, a dominant color of the image, moment data for the image, a URL pointing to a thumbnail of the image, and dimensions of the thumbnail of the image.

A title attribute can include, for example, the title or name of the item. In embodiments where the item is remotely stored (like a website), the title attribute can include information pulled from the website (e.g., a byline, a header, an article title, etc.). In embodiments where the item is locally stored, the title attribute can include the name of the file that is uploaded, or it can include a name stored in the file's metadata.

A source folder identifier identifies the source folder to which an item or items have been added. A source folder identifier can be a UUID, or it can be unique only at the service-level (e.g., an identifier that is unique to the server, but not universally unique). In some embodiments, the source folder identifier can be a token that is assigned to the source folder by, for example, the server.

In some embodiments, a client can request to add a plurality of items (of the same or different types) to a source folder at the same time (e.g., the request can relate to a website and an uploaded PDF), or a client can make multiple requests (each request to add one or more items to a source folder) before the server responds. Each item in the request(s) has corresponding item attributes, and the item attributes are returned to the client in the server's response to the client's request(s) to add one or more items to a source folder. The item attributes for each item can include one, or any combination of: a MIME attribute; an item type (e.g., upload, link); and a URL.

MIME stands for Multipurpose Internet Mail Extensions. A MIME attribute includes a type and a subtype, which are two strings, separated by a '/'. No space is allowed. The type represents the category and can be a discrete or a multipart type. The subtype is specific to each type. MIME types include for example: text, image, audio, video, and application. MIME subtypes include, for example: (for text) plain, HTML, JavaScript, and CSS; (for image) gif, png, jpeg, bmp, and webp; (for audio) midi, mpeg, webm, ogg, and wav; (for video) webm and ogg; (for application) octet-stream, pkcs12, vnd.mspowerpoint, xhtml+xml, xml, and pdf.

An item type attribute can be used to identify an item type for the item in the request to add an item to the source folder. For example, an item type attribute can be "upload" for when the item is locally stored content (e.g., content that has to be uploaded to the server such as a document, a video, or an audio file), a "note" for when an item is a user-defined note (e.g., a grocery list), or a "link" for when the item is remotely stored content that is accessible via a link.

A URL can be included in the server's response. In embodiments where the item is locally-stored content, the URL can direct a web browser to a location on the server (e.g., on the same domain as the server, or on a sub-domain of the server that directs clients to the server) where the item, or some portion of the item, can be accessed (e.g., a URL of a location where the item was uploaded onto the server). In embodiments where the item is remotely stored, the URL can direct a web browser to a location on an external server where the item (or some portion of the item) can be accessed. A URL can point to a wide variety of content, including webpages, YouTube videos, images, documents, videos, and audio files.

With the preceding steps completed, the server can add an item to an identified source folder. With one or more items added to a source folder, a user can then request the server to create a website using those items, as shown in step 104. Thus, in step 104, the client sends to the server a website creation request. The website creation request includes one or more of the following attributes: the source folder identifier, the name, a subtitle, a description, an image URL, and a theme.

The source folder identifier is included in the website creation request to help the server to know which source folder to draw from to create the website. Thus, any item or items that have been added to the source folder can be used to create the website subject to the request.

The name included in the website creation request can be, for example, the source folder name. It is also contemplated that the name can be a name for the website that is being requested (e.g., a user-defined name). Other possible name attribute properties are described above.

A subtitle, like other descriptive attributes, can include information that is taken from one or more of the items contained in the source folder, or it can be taken from the source folder itself (e.g., from source folder metadata). In some embodiments, the subtitle attribute can be user-defined.

A description, like other descriptive attributes, can include information that is taken from one or more of the items contained in the source folder (e.g., it can be algorithmically generated based on the contents of the items in the source folder), or it can be taken from the source folder itself (e.g., from source folder metadata). In some embodiments, the description attribute can be user-defined.

An image URL attribute includes a URL that points to an image that is stored either on the server or on a remote server, where the image that the URL points to is relevant to the website that is subject to the client's request. The image URL attribute allows the client's website creation request to include a preferred image that can be used on the website as, for example, a featured image (e.g., on a banner, a header, etc.).

A theme attribute can also be included in the client's request to generate a website. A theme attribute includes a website theme according to which the generated website must be created. A theme can define formatting, styling, colors, fonts, layout, etc. for a website, and inclusion of a theme attribute allows for a user to make a theme selection so that the client's request can include that theme selection in the theme attribute. A theme can also define a general structure for a website. For example, a theme might define whether a website is a flat, scrollable single page of content or a series of interlinked pages. In some embodiments, the theme can be user-selected, but in the absence of a user selection, a default theme can instead be implemented and sent in the request. In some embodiments, if no theme attribute is included in the request, then the server uses a default theme.

Next, the server generates a website in response to the client's request, as shown in step 106. The website that is generated, which can be accessed using a website URL (or other type of resource locator that facilitates access to the website over a network connection), comprises all items that have been added to the source folder.

Once the website has been generated, the server sends, to the client, a response to the website creation request, as shown in step 108. In some embodiments, actual website generation may alternatively occur when the website is requested by the user via http, https, or other website protocol. The response to the website creation request includes one, or any combination of the following: author attributes; an author identifier; an analytics ID; a created-at attribute; a data storage usage attribute; a description; a website image; a website name; the source folder identifier; total data storage usage; the website URL; and a visual completion status.

Author attributes can include an author name and an author avatar. In some embodiments, the author is the user that caused the client to send a website creation request to the server. Thus, the author name can be that user's name or username. The author avatar can be a user-defined image that is associated with the user or with the client. In some embodiments, the author and author avatar can both be user-defined.

An author identifier is used to identify the author of the website. In some embodiments, the author identifier is a token. The author identifier can be a UUID, or it can be an identifier that is unique within the server without being universally unique. The purpose of the author identifier is to allow the server to distinguish between authors of different websites that are generated in response to different website generation requests from different clients (i.e., requests from different authors).

An analytics ID can be included in some embodiments. The analytics ID can be, for example, an identifier that is specific to a website analytics aggregator (e.g., a Google Analytics ID). It can be useful in allowing an author (i.e., a user) to track data related to the generated website.

A created-at attribute includes one or both of a time and date at which the website was generated. It can additionally or alternatively include a date and time at which the response to the website generation request is sent to the client.

A data storage usage attribute includes information about the size of the generated website, which can be measured in bytes (e.g., kilo-, mega-, giga-). This information can be useful for optimization. For example, when a generated website exceeds a certain space threshold, the client can initiate a request to optimize the images on the generated website by changing the format or resolution of each image. This is important to reduce website loading times, which can often drive impatient users away from a website they are otherwise interested in visiting.

A description attribute is described above in more detail. In the response to the website generation request, the description attribute can include a description of the generated website, for example. In some embodiments, a description of a source folder can be the same as a description of a website that is generated using that source folder.

A website image attribute can include a featured image for the website. In some embodiments, the website image attribute can include information sufficient to describe several aspects of an image associated with the website. For example, the image attributes can include an array of information about an image including a full URL pointing to the original image or to an optimized version of the image, dimensions of the image, a URL pointing to a thumbnail of the image, and dimensions of the thumbnail of the image. In embodiments, a website image attribute can also include a focal point. The focal point defines the central point of interest for an image. When a focal point is defined, and the featured image is larger than the user's viewport (e.g., the user may be viewing the website on a mobile device), embodiments will avoid cropping the focal point out of the image.

A source folder identifier can also be included in the response. The source folder identifier identifies the source folder from which the website was created. It can be a UUID or an identifier that is unique within the server without being universally unique.

The response to the website creation request includes the website URL. The website URL can be used by, for example, a web browser to access the website that the server generated according to the client's request to generate a website from a source folder. The website URL can be used to directly access the generated website, or it can cause one or more re-directs resulting in accessing the generated website. Re-directs to access a generated website can be useful for website analytics including tracking where traffic to the generated website originates.

A visual completion status can also be included in the response to the website generation request. A visual completion status can indicate to a client whether the generated website's visual features have been completed. In some embodiments, a website's visual features are completed when all of the images on the website are optimized. Optimized images can be stored on the server that handles website generation or on another server for easy access by the generated website.

In some embodiments, the step of receiving a request to add an item to a source folder can comprise information sufficient to add multiple items to the source folder at the same time. For example, a user on a client computer could select some combination of either remotely stored items, locally stored items, or both, and information sufficient to identify and add those items to a source folder could be transmitted in the request according to the description above.

It is also contemplated that the step of receiving a request to add an item to a source folder can be carried out multiple times (e.g., in sequence or in parallel), where each request corresponds to a different item that a user on a client computer would like added to a source folder. The step of sending a response to the request to add an item to a source folder can be carried out once in response to multiple requests, or the server can generate a unique response to each request (e.g., each request corresponds to a single item and has a unique corresponding response).

The end result is that a source folder can hold any number of items, and when the server receives a request to generate a website, the server generates the website using all of the contents of the source folder. In some embodiments, a request to generate a website can also include instructions to include only a subset of items in the source folder.

In some embodiments, multiple source folders can be used to create a website. When multiple source folders are used in the course of generating a website, the server may use each source folder to create a different section on the website. For example, if a first source folder includes items related to chickens (e.g., articles, research papers, pictures) and a second source folder includes items related to eggs (e.g., articles, research papers, pictures), then the resulting website that the server generates using the first and second source folders would include two sections: a chicken section and an egg section. In the same or alternative embodiments, the server could generate a website where all the content from each source folder is combined into a single section of the website.

To create a website using multiple source folders, it is contemplated that the request to generate a website can identify multiple source folders by including multiple source folder identifiers. Then, when the server generates the website, it has sufficient information from the request to incorporate the contents of multiple source folders, and it can then incorporate sections into the website where each source folder corresponds to a section on the website.

In some embodiments, a source folder can additionally or alternatively include any number of subfolders. For example, a "chicken" source folder can include "domesticated chickens" and "chicken history" subfolders, where each subfolder can contain items. In these embodiments, the source folder itself can include one or more items as well as one or more subfolders. In embodiments where a source folder includes one or more subfolders, the request to generate a website includes, at a minimum, a source folder identifier for the main source folder that contains one or more subfolders. By identifying the source folder, the server can get information about all of the contents of the source folder, including information about items and subfolders contained in the source folder. It is also contemplated that the request to generate a website can include one or more source folder identifiers, where each source folder identifier corresponds to a source folder or subfolder (which can be considered a type of source folder).

As described above with relation to generating a website using multiple source folders, when a source folder includes subfolders, those subfolders can each be used by the server to create subsections on the generated website. For example, a main source folder can be a main section, and each subfolder within that source folder can be a subsection to the source folder's main section. This form of hierarchy can be repeated for any number of source folders and subfolders. It is contemplated that subfolders can themselves contain subfolders, and so on.

During the step of generating a website, the server can undertake several steps to create item representatives from the items in the one or more source folders used to create the website. For each item, the server can either create or identify one or more item representatives that can be used in the website. An item representative can be (or include), for example, an image, title, subtitle, and description pertaining to an item. In some embodiments, an item representative can also be (or include) a name and a title, as described above. In this way, one item can have one or more item representatives associated with it.

In some embodiments, the server can create the item representatives from the items in a source folder at the time the client sends a website creation request. In other embodiments, the server can create the item representatives at the time the items are added to the source folder, and then the server can use those item representatives when generating a website. In this case, the server can use the item representatives in both the source folder and the corresponding website.

In other embodiments, the server can create a shell of a website (i.e., a website that does not include any items) at the time the client sends a website creation request. Then, the server can dynamically create the item representatives at the time that a web browser requests that website from the server and fit the item representatives into the shell.

Item representatives can then be used by the server in the process of generating a website. For example, websites are generated, at least in part, according to a layout, where the layout includes guidelines about where item representatives (e.g., one or more parts of an item representative) for each item should be placed on the website, as well as how those item representatives should be styled (e.g., fonts, image cropping, location, orientation, border, and any other style information that can be applied using, for example, a CSS sheet). A layout can be included with a user-selected theme, or, if no user-selected theme is defined, a default layout (or, in some embodiments, a set of default layouts) is used.

With item representatives created for each item, generating a website then becomes a matter of fitting item representatives into corresponding places on the website according to the layout (e.g., placing an item description in an item description slot and fitting a corresponding item image in an item image slot that is positioned above the item description according to the layout).

Multiple layouts can also be used in the generation of a single website. For example, if a website includes multiple sections (e.g., a website is generated using items from multiple source folders, where each source folder is used for a different section of a generated website), then each section of the website can be generated according to a different layout. It is similarly contemplated that a single layout can be used for multiple sections of a generated website, causing each section to have a similar look and feel. As mentioned above, one or more layouts can be included in a theme.

Layouts facilitate visually pleasing presentations of item representatives by, for example helping to avoid undesirable image clipping and text truncation/clipping. Layouts also help to achieve variation and variety in the generated website's appearance. To further improve variety, embodiments may use one of several default layouts when a user does not define a layout (e.g., either by selecting a layout or by selecting a theme having one or more layouts). Layouts can help avoid dedicating a large space on a website for a low-resolution image that would not look good in that large space. Layouts can help to eliminate visual gaps on a generated website. Layouts can also be used to determine which item representatives would be appropriate for different areas of the website. For example, a layout can include a requirement that a text description item representative should be placed only if the text description includes fewer than 140 characters. In another example, a layout can require an image item representative to have a resolution that exceeds a certain threshold before it will display that image item representative in an image space on a generated website.

In some embodiments, layouts can include dynamic item slots. For example, if a layout includes slots for both an item description and an accompanying item image, but the available item image has a resolution that is too low for the item image slot, then the layout can deviate from those default slots by, for example, making the item image slot smaller and causing the item description slot to re-size based on the re-sized item image slot. A layout of the inventive subject matter can thus be allowed to deviate from its ordinary designs (e.g., slot sizes and the like) to accommodate irregular item representatives.

In embodiments, the server can generate a static website written in a markup language like HTML. In these embodiments, markup language labels in a corresponding document directly define the presentation of the website, including the size and positioning of the items, metadata, and sections. A web browser can then render the website as specified in the markup language document. In embodiments, the server can generate a programmatic website written in a scripting language like JavaScript. In these embodiments, one or more scripts can instruct the web browser to fetch the components of the website (i.e., the items, metadata, sections, etc.) and to render them in a particular way. A programmatic website can include myriad features such as responsive design, which formats the website for particular browsers, displays, and devices. A programmatic website, for example, can also permit users to interactively edit the website, including the items, metadata, and sections, within the website. In embodiments, the server can generate a website that includes both static and programmatic components.

In embodiments, the server can regenerate a website based on changes to the contents of the associated source folder (and any subfolders). For example, if a user adds new items to a source folder after the server has already generated a website, the server may regenerate the website to include the new items. Similarly, the server may regenerate the website if one or more existing items within the source folder have changed. For example, if a user changes the representative image or the title for an item, or deletes the item, the server may regenerate the website to reflect the changes. In embodiments, the client notifies the server when items are added to or changed within a source folder (and any subfolders), and the server automatically regenerates the website. Alternatively, the server may not regenerate the website until receiving an explicit instruction from the user to do so.

An embodiment of the inventive subject matter that incorporates some of the concepts above are shown in FIGS. 2A and 2B. The embodiment shown in these figures incorporates many of the same steps as described above with respect to FIGS. 1A and 1B. Once a server receives the user-selected items as described in step 200, the server then adds those user-selected items to a source folder, as shown in step 202. As shown in step 204, the server receives a request from the client to create a website using the source folder and its contents. And as shown in step 206, the server generates item representatives for each of the user-selected items. An item representative includes, for example, a description of the item, a name of the item, a size of the item, an image related to the item, etc. These attributes are discussed above in more detail. It is contemplated that steps 206 and 204 can be completed in any order. Next, in response to the client's request to generate a website, the server generates a website using the item representatives it created for each item in the source folder, where the generated website can be accessed via URL, as shown in step 208. Finally, the server sends the generated website's URL to the client so the client (or any other computing device) can access the website via the URL.

In another embodiment shown in FIGS. 3A and 3B, a method of generating a website incorporates folders and subfolders to create a website having different sections (and, in some embodiments, subsections). First, a server receives a set of user-selected items from a client, as shown in step 300. The items from the set of user-selected items received from the client can then be added, by the server, to one or more subfolders within a source folder, as shown in step 302. For example, if the set of user-selected items includes two items, then a first item can be added to a first subfolder and a second item can be added to a second subfolder. As described above the first and second subfolder can exist within the source folder, or multiple source folders can exist, each source folder containing one or more items.

In another step, the server receives a request from the client to generate a website, as shown in step 304. The request, which is analogous to the request described above with respect to FIGS. 1A and 2B, can include additional information sufficient to identify what items to generate the website with, such as a source folder identifier. In another step, the server generates item representatives for each item in the set of user-selected items, as shown in step 306. This step can occur at any time after the server has been given the items by the user and before it uses the items to create a website. Item representatives are described above in more detail.

Finally, the server generates a website using the item representatives that the server generated based on the items in the source folder and its subfolders. The generated website includes up to as many sections as there are subfolders within the source folder, as shown in step 308.

Thus, specific systems and methods of generating websites have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of generating a new web site, the method comprising the steps of:
    creating a source folder on a server;
    creating a first sub-folder and a second sub-folder within the source folder;
    adding one or more first content items to the first sub-folder;
    adding one or more second content items to the second sub-folder; and
    in response to a single request from a client to create a new website based on the source folder, automatically generating the new website and a new website URL, wherein:
        the new website comprises a first respective item representative for each of the one or more first content items and a second item representative for each of the one or more second content items;
        each of the first respective item representatives appears in a first section of the new web site and each of the second respective item representatives appears in a second section of the new website;
        each of the first respective item representatives and the second respective item representatives comprises at least a text block and an image; and
        the new website is automatically generated without any user input to specify any of the size, position, type, or appearance of any of the first respective item representatives or the second respective item representatives.

2. The method of claim 1, wherein the server automatically determines a layout of each respective first item representative and each respective second item representative within the website.

3. The method of claim 1, wherein the one or more first content items comprises at least one note item.

4. The method of claim 1, wherein the first sub-folder and the second sub-folder are not nested.

5. The method of claim 1, further comprising the steps of:
- receiving, by the server from the client, a user-initiated request to add, delete, or change the one or more first content items within the source folder; and
- regenerating, by the server, at least part of the website based on the added, deleted, or changed one or more first content items within the source folder.

6. The method of claim 1, wherein the website is written in a scripting language that instructs a web browser to fetch the one or more first content item from the server and render them on a display.

7. The method of claim 1, further comprising a token associated with the source folder.

8. The method of claim 7, wherein the token comprises a UUID.

9. The method of claim 1, wherein the request further comprises at least one of:
- a name;
- a subtitle;
- a description; or
- an image URL.

* * * * *